(12) United States Patent
Taherzadeh Boroujeni et al.

(10) Patent No.: US 12,082,167 B2
(45) Date of Patent: Sep. 3, 2024

(54) TRANSMISSION CONTINUITY CAPABILITY REPORTING

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 17/216,477

(22) Filed: Mar. 29, 2021

(65) Prior Publication Data
US 2022/0312409 A1    Sep. 29, 2022

(51) Int. Cl.
*H04W 72/0446*    (2023.01)
*H04L 5/00*    (2006.01)
(Continued)

(52) U.S. Cl.
CPC ....... *H04W 72/0446* (2013.01); *H04L 5/0048* (2013.01); *H04W 24/08* (2013.01); *H04W 72/51* (2023.01); *H04W 8/22* (2013.01)

(58) Field of Classification Search
CPC .. H04L 25/0224; H04L 5/0048; H04W 24/08; H04W 72/0446; H04W 72/048; H04W 8/22; H04W 8/24
See application file for complete search history.

(56) References Cited

U.S. PATENT DOCUMENTS

2013/0176868 A1*   7/2013   Gaal ................... H04B 7/0404
                                                                370/252
2013/0322302 A1*   12/2013   Gholmieh ......... H04W 36/0055
                                                                370/328

(Continued)

FOREIGN PATENT DOCUMENTS

CN             106230077 A   *   12/2016
WO     WO-2019193426 A1   *   10/2019   .......... H04B 7/0426
(Continued)

OTHER PUBLICATIONS

Shim et al. "Power control of DMRS bundle", Korean Patent Application KR-10-2021-0006879, Jan. 10, 2021 (Year: 2021).*
(Continued)

*Primary Examiner* — Shah M Rahman
(74) *Attorney, Agent, or Firm* — Arun Swain

(57) ABSTRACT

This disclosure provides systems, methods and apparatus, including computer programs encoded on computer storage media, for transmission continuity capability reporting. A user equipment (UE) may generate or otherwise determine UE capability information related to a capability of the UE to maintain a transmission continuity for one or more uplink transmissions across a wireless channel. The UE may send an indication of the transmission continuity capability information, which may be based on a parameter of continuity, an accuracy of continuity, or both, to a base station (BS). The UE may transmit the one or more uplink transmissions, including reference signals, data messages, or both, in accordance with the transmission continuity capability. For example, the UE may maintain a transmission continuity, a transmit power, or both for transmissions across multiple resource blocks (RBs). The BS may perform a joint channel estimation procedure based on the one or more uplink transmissions.

30 Claims, 10 Drawing Sheets

(51) Int. Cl.
*H04W 24/08* (2009.01)
*H04W 72/51* (2023.01)
*H04W 8/22* (2009.01)

(56) References Cited

U.S. PATENT DOCUMENTS

| | | | |
|---|---|---|---|
| 2015/0208415 A1* | 7/2015 | Xu | H04W 72/23 370/329 |
| 2018/0234997 A1* | 8/2018 | Hosseini | H04L 1/08 |
| 2019/0190687 A1* | 6/2019 | Yi | H04L 5/1469 |
| 2019/0230683 A1* | 7/2019 | Akkarakaran | H04L 5/0053 |
| 2019/0268127 A1* | 8/2019 | Hosseini | H04L 5/0053 |
| 2019/0349137 A1* | 11/2019 | Hosseini | H04L 1/1887 |
| 2020/0022161 A1* | 1/2020 | Yang | H04L 1/16 |
| 2020/0059868 A1* | 2/2020 | Yang | H04W 76/15 |
| 2020/0162133 A1* | 5/2020 | Harrison | H04B 7/0691 |
| 2020/0266867 A1* | 8/2020 | Park | H04W 52/50 |
| 2020/0413436 A1* | 12/2020 | Bae | H04W 72/14 |
| 2021/0050889 A1* | 2/2021 | Park | H04W 72/042 |
| 2021/0126753 A1* | 4/2021 | Mochizuki | H04W 72/542 |
| 2021/0282137 A1* | 9/2021 | Wang | H04W 72/0446 |
| 2022/0224467 A1* | 7/2022 | Vos | H04L 5/0039 |
| 2022/0225240 A1* | 7/2022 | Fakoorian | H04L 25/0224 |
| 2022/0225322 A1* | 7/2022 | Shim | H04W 72/0413 |
| 2022/0225388 A1* | 7/2022 | You | H04L 5/0094 |
| 2022/0279455 A1* | 9/2022 | Cozzo | H04W 52/146 |
| 2023/0354340 A1* | 11/2023 | Su | H04L 1/1858 |

FOREIGN PATENT DOCUMENTS

WO    WO-2022151444 A1 *   7/2022
WO    WO-2022188004 A1 *   9/2022

OTHER PUBLICATIONS

Vos et al. Method and Apparatus for Wireless Communication With Phase Continuity, U.S. Appl. No. 63/135,296, filed Jan. 8, 2021 (Year: 2021).*

International Search Report and Written Opinion—PCT/US2022/017956—ISA/EPO—Jun. 2, 2022.

Moderator (China Telecom): "[104-e-NR-CovEnh-03] Summary of email Discussion on Joint Channel Estimation for PUSCH", 3GPP Draft, R1-2102161, 3GPP TSG RAN WG1 Meeting #104-e, 3rd Generation Partnership Project (3GPP), Mobile Competence Centre, 650, Route Des Lucioles, F-06921, Sophia-Antipolis Cedex, France, vol. RAN WG1, No. E-Meeting, Jan. 25, 2021-Feb. 5, 2021, Feb. 8, 2021 (Feb. 8, 2021), XP051977732, 92 Pages, Retrieved from the Internet: URL: https://ftp.3gpp.org/tsg_ran/WG1_RL1/TSGR1_104-e/Docs/R1-2102161.zipR1-2102161-[104-e-NR-CovEnh-03].docx [retrieved on Feb. 8, 2021] paragraph [02.3] paragraph [03.2].

Qualcomm Incorporated: "Joint Channel Estimation for PUSCH", 3GPP Draft, R1-2112232, 3GPP TSG RAN WG1 Meeting #107-e, 3rd Generation Partnership Project (3GPP), Mobile Competence Centre, 650, Route Des Lucioles, F-06921, Sophia-Antipolis Cedex, France, vol. RAN WG1, No. e-Meeting, Nov. 11, 202-Nov. 19, 2021, Nov. 6, 2021 (Nov. 6, 2021), XP052075338, 26 Pages, Retrieved from the Internet:URL: https://ftp.3gpp.org/tsg_ran/WG1_RL1/TSGR1_107-e/Docs/R1-2112232.zip R1-2112232 Joint channel estimation for PUSCH.docx [retrieved on Nov. 6, 2021] the whole document.

Sierra Wireless: "Design Considerations for Joint Channel Estimation for PUSCH", 3GPP Draft, R1-2101329, 3GPP TSG RAN WG1 #104-e, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021 (Jan. 19, 2021), XP051971516, 9 Pages, Retrieved from the Internet: URL:https://ftp.3gpp.org/tsg_ran/WG1_RL1/TSGR1_104-e/Docs/R1-2101329.zip R1-2101329 Joint channel estimation for PUSCHv5F.docx [retrieved on Jan. 19, 2021] paragraph [0004].

VIVO: "Discussion on Joint Channel Estimation for PUSCH", 3GPP Draft, R1-2100459, 3GPP TSG RAN WG1 #104-e, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 18, 2021 (Jan. 18, 2021), XP051970381, 6 Pages, Retrieved from the Internet: URL:https://ftp.3gpp.org/tsg_ran/WG1_RL1/TSGR1_104-e/Docs/R1-2100459.zip R1-2100459 Discussion on Joint channel estimation for PUSCH.docx [retrieved on Jan. 18, 2021] paragraph [0002].

* cited by examiner

TRANSMISSION CONTINUITY CAPABILITY REPORTING

TECHNICAL FIELD

This disclosure relates to wireless communications, including transmission continuity capability reporting.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

A method for wireless communications at a user equipment (UE) is described. The method may include transmitting UE capability information including an indication of an uplink transmission continuity capability of the UE to a base station (BS), where the uplink transmission continuity capability includes one or more of a phase continuity or an amplitude continuity associated with slots for one or more uplink transmissions and transmitting the one or more uplink transmissions to the BS over a wireless channel in accordance with the uplink transmission continuity capability of the UE.

An apparatus for wireless communications is described. The apparatus may include a processing system and a first interface configured to output UE capability information including an indication of an uplink transmission continuity capability of the UE to a component of a BS, where the uplink transmission continuity capability includes one or more of a phase continuity or an amplitude continuity associated with slots for one or more uplink transmissions. The first interface or a second interface may be configured to output the one or more uplink transmissions to the BS over a wireless channel in accordance with the uplink transmission continuity capability of the UE.

Another apparatus for wireless communications at a UE is described. The apparatus may include means for transmitting UE capability information including an indication of an uplink transmission continuity capability of the UE to a base station (BS), where the uplink transmission continuity capability includes one or more of a phase continuity or an amplitude continuity associated with slots for one or more uplink transmissions and means for transmitting the one or more uplink transmissions to the BS over a wireless channel in accordance with the uplink transmission continuity capability of the UE.

A non-transitory computer-readable medium storing code for wireless communications at a UE is described. The code may include instructions executable by a processor to transmit UE capability information including an indication of an uplink transmission continuity capability of the UE to a BS, where the uplink transmission continuity capability includes one or more of a phase continuity or an amplitude continuity associated with slots for one or more uplink transmissions and transmit the one or more uplink transmissions to the BS over a wireless channel in accordance with the uplink transmission continuity capability of the UE.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
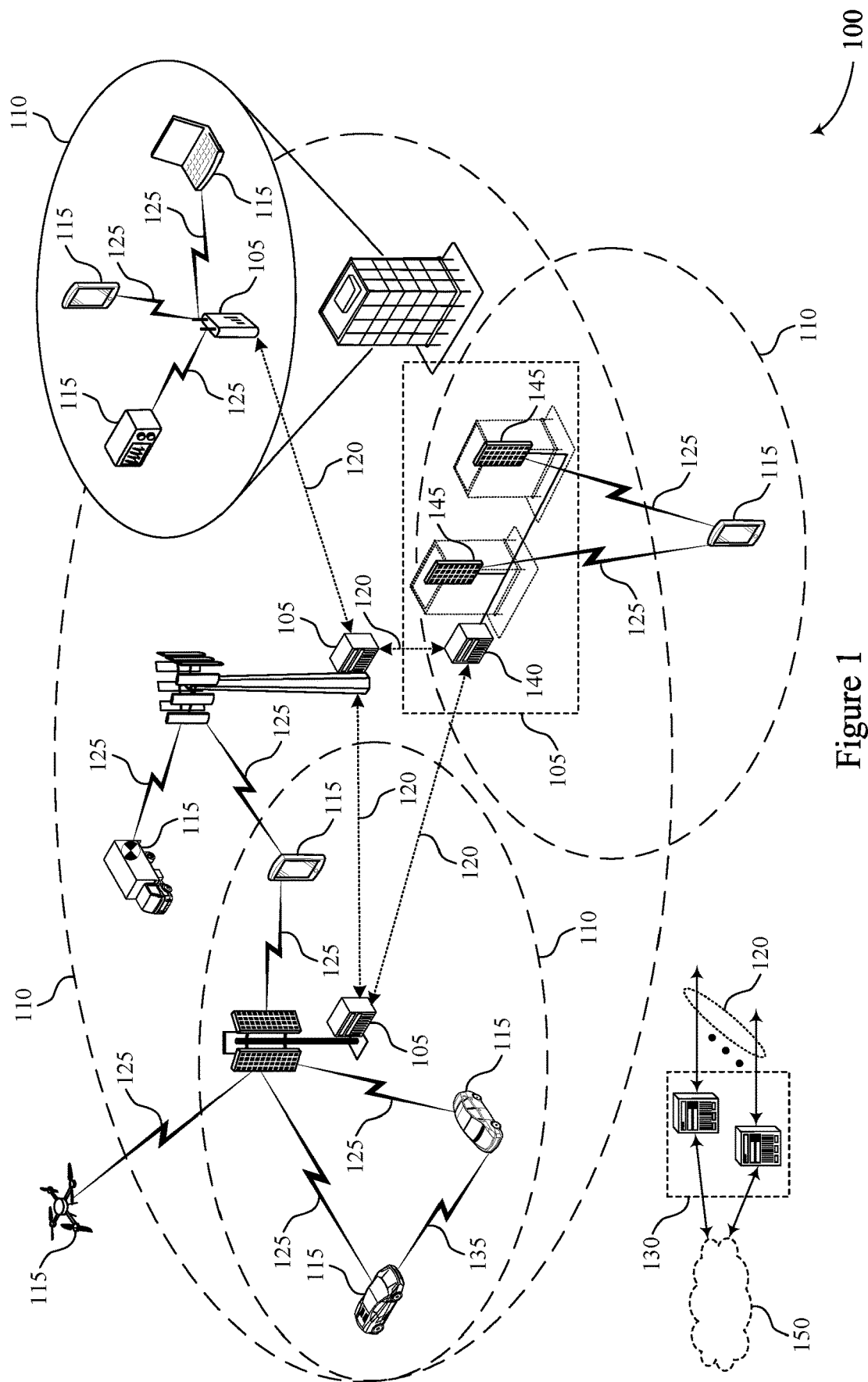
FIG. 1 illustrates an example of a wireless communications system that supports transmission continuity capability reporting.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a user equipment (UE) may transmit one or more reference signals to a base station (BS) or one or more components of a BS, such that the BS may perform channel estimation. For example, the UE may perform an uplink transmission including one or more demodulation reference signals (DMRSs), phase tracking reference signals (PTRSs), or the like to the BS on an uplink channel (such as a physical uplink control channel (PUCCH) or a physical uplink shared channel (PUSCH)). The UE may divide the one or more reference signals across multiple time slots or may repeat a reference signal for multiple time slots, which may allow the BS to perform a joint channel estimation across the multiple time slots. In some examples, one or more time-frequency resources allocated for the uplink transmission may be contiguous (e.g., adjacent resources) or may be non-contiguous with a resource gap between resources allocated for the transmission. In some cases, the UE may be capable of maintaining a phase continuity for a transmit waveform as well as a transmit power when performing the uplink transmission. If the UE is able to maintain the phase continuity, the BS may perform a wideband estimation of the relative phase between slots. However, the BS may be unaware of the capability of the UE to perform the uplink transmission while maintaining the phase continuity.

A UE may transmit an indication of an uplink transmission continuity capability to a BS or one or more components of a BS. The indication may include one or more parameters, such as a radio frequency (RF) phase, an uplink transmit power, a relative RF phase for different resource blocks (RBs), or the like. In some examples, the indication may include an index of a category of the uplink transmission continuity capability, and the BS may determine the uplink transmission continuity capability from the index based on a list of uplink transmission continuity capabilities. In some other examples, the UE may indicate the uplink transmission continuity capability explicitly, such as in the form of a phase resolution value. The UE may send one or more uplink transmissions, which may include reference signals, to the BS according to the uplink transmission continuity capability. In some examples, the BS may perform a joint channel estimation across multiple time slots using the reference signals.

Particular implementations of the subject matter described in this disclosure can be implemented to realize one or more of the following potential advantages. A UE may transmit an uplink transmission continuity capability to one or more components of a BS and one or more reference signals according to the continuity, such that the BS may perform channel estimation using the reference signals. In some examples, the transmission continuity capability may include a phase continuity or an amplitude continuity for the reference signals such that the BS may perform joint channel estimation. The UE may maintain a relative phase among different RBs, which may reduce processing overhead and latency involved with the BS performing channel estimation for independent RBs. Additionally, the UE may perform one or more uplink transmissions based on the reference signals, which may further reduce signaling overhead and latency related to the BS receiving the uplink transmissions. Further, the BS may determine the UE transmits with a phase continuity, amplitude continuity, or other type of user interface continuity and may perform joint channel estimation.

FIG. 1 illustrates an example of a wireless communications system 100 that supports transmission continuity capability reporting. The wireless communications system 100 may include one or more BSs 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BS 105 may communicate with the core network 130, or with one another, or both. For example, the BSs 105 may interface with the core network 130 through one or more backhaul links 120 (such as via an S1, N2, N3, or other interface). The BSs 105 may communicate with one another over the backhaul links 120 (such as via an X2, Xn, or other interface) either directly (such as directly between BSs 105), or indirectly (such as via core network 130), or both. In some examples, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other examples, as shown in FIG. 1.

The UEs 115 and components of the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (such as in a carrier aggregation configuration), a carrier also may have acquisition signaling or control signaling that coordinates operations for other carriers. A carrier may be associated with a frequency channel (such as an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (such as of the same or a different radio access technology).

The communication links 125 shown in the wireless communications system 100 may include uplink transmissions from a UE 115 to one or more components of a BS 105, or downlink transmissions from a BS 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 (such as the BSs 105, the UEs 115, or both) may have hardware configurations that support communications over a particular carrier bandwidth or may be configurable to support communications over one of a set of carrier bandwidths. In some examples, the wireless communications system 100 may include BSs 105 or UEs 115 that support simultaneous communications via carriers associated with multiple carrier bandwidths. In some examples, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (such as over a carrier) and may be associated with an identifier for distinguishing neighboring cells (such as a physical cell identifier (PCID), a virtual cell identifier (VCID), or others). In some examples, a cell also may refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the BS 105. For example, a cell may be or include a building, a subset of a building, or exterior spaces between or overlapping with geographic coverage areas 110, among other examples.

A macro cell generally covers a relatively large geographic area (such as several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A BS 105 may support one or multiple cells and also may support communications over the one or more cells using one or multiple component carriers.

In some examples, a carrier may support multiple cells, and different cells may be configured according to different protocol types (such as MTC, narrowband IoT (NB-IoT), enhanced mobile broadband (eMBB)) that may provide access for different types of devices.

In some examples, one or more components of a BS 105 may be movable and therefore provide communication coverage for a moving geographic coverage area 110. In some examples, different geographic coverage areas 110 associated with different technologies may overlap, but the different geographic coverage areas 110 may be supported by the same BS 105. In other examples, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some examples, not be aligned in time. The techniques described herein may be used for either synchronous or asynchronous operations.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or one or more components of a B S 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some examples, groups of the UEs 115 communicating via D2D communications may utilize a one-to-many (1:M) system in which each UE 115 transmits to every other UE 115 in the group. In some examples, a BS 105 facilitates the scheduling of resources for D2D communications. In other cases, D2D communications are carried out between the UEs 115 without the involvement of a BS 105.

In some systems, the D2D communication link 135 may be an example of a communication channel, such as a sidelink communication channel, between vehicles (such as UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (such as BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105). In some cases, a network device, such as a BS 105, may distribute different layers of functionality across physically separated components. For example, one or more of the BSs 105 described herein may operate as or otherwise implement a disaggregated radio access network (D-RAN) or an open radio access network (O-RAN).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some examples, the wireless communications system 100 may support millimeter wave (mmW) communications between the UEs 115 and the BSs 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some examples, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some examples, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as one or more components of a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (such as antenna panels) to conduct beamforming operations for directional communications with a UE 115. Some signals (such as synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (such as by a transmitting device, such as one or more components of a BS 105, or by a receiving device, such as a UE 115) a beam direction for later transmission or reception by the BS 105.

Some signals, such as data signals associated with a particular receiving device, may be transmitted by a BS 105 in a single beam direction (such as a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some examples, transmissions by a device (such as by a BS 105 or a UE 115) may be performed using multiple beam directions, and the device may use a combination of digital precoding or radio frequency beamforming to generate a combined beam for transmission (such as from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (such as a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as when receiving a data signal). The single receive configuration may be aligned in a beam direction determined based on listening according to different receive configuration directions (such as a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations, a UE 115 may send one or more uplink transmissions to a BS 105 via one or more uplink channels, such as an uplink control channel, an uplink shared channel, or both. The uplink transmissions may include one or more reference signals and one or more data messages sent across multiple RBs. In some examples, the BS 105 may perform a joint channel estimation procedure based on the reference signals, which may involve a DMRS bundling procedure, a phase noise tracking procedure, or both. In some examples, the UE 115 may support the joint channel estimation if the UE 115 is capable of transmitting the reference signals across multiple RBs while maintaining a phase continuity, a transmit power, or both. However, the BS 105 may be unaware of the capability of the UE 115 to maintain the transmit power, maintain the phase continuity, or both when determining whether to perform a joint channel estimation procedure, such as for receiving an uplink transmission from the UE 115.

In some examples, a UE 115 may generate or otherwise determine UE capability information related to a capability of the UE 115 to maintain a transmission continuity. The UE 115 may send an indication of the transmission continuity capability information to a BS 105. In some implementations, the UE 115 may indicate one among multiple categories of transmission continuity capability in the transmission continuity capability information depending on a parameter of continuity, an accuracy of continuity, or both. The UE 115 may transmit one or more uplink transmissions, including reference signals, data messages, or both, in accordance with the transmission continuity capability. For example, the UE 115 may maintain a transmission continuity, a transmit power, or both for transmissions across multiple RBs over multiple slots, where a slot is a time resource for communicating the RBs.

Figure 2:
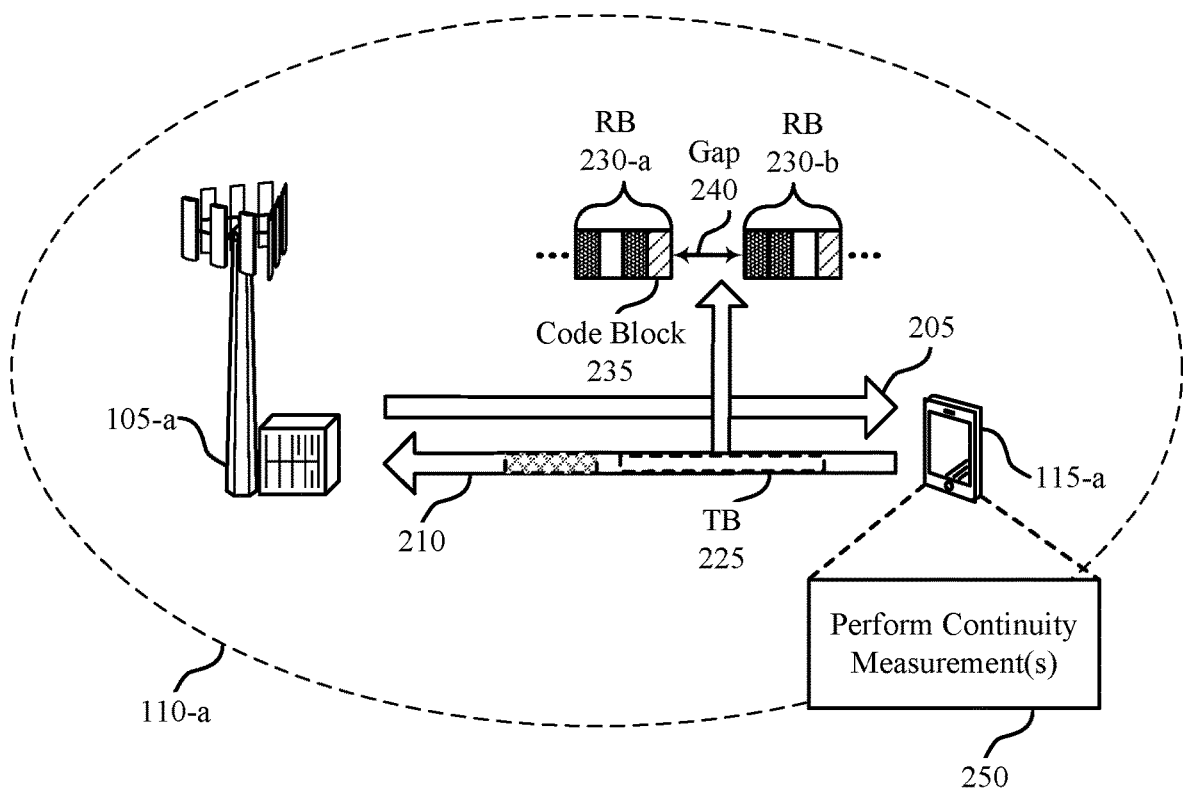
FIG. 2 illustrates an example of a signaling diagram that supports transmission continuity capability reporting.

FIG. 2 illustrates an example of a signaling diagram 200 that supports transmission continuity capability reporting. In some implementations, the signaling diagram 200 may implement aspects of the wireless communications system 100 and may include a UE 115-a and a BS 105-a within coverage area 110-a, which may be examples of the UE 115 and the BS 105 within the coverage area 110 as described with reference to FIG. 1. In some implementations, the BS 105-a may communicate data, control signaling, or both with UE 115-a. For example, the BS 105-a may transmit data or control signaling to UE 115-a via downlink communication link 205. Similarly, the UE 115-a may transmit data or control signaling to BS 105-a via uplink communication link 210. In some implementations, the UE 115-a and the BS 105-a may communicate based on a capability of UE 115-a to support a transmission continuity (e.g., a phase continuity or an amplitude continuity).

In some implementations, the UE 115-a may transmit signaling to the BS 105-a via one or more uplink channels. For example, the UE 115-a may transmit one or more reference signals 215 to the BS 105-a via uplink communication link 210 over an uplink control channel, an uplink shared channel, or both. The uplink control channel may be a physical uplink control channel (PUCCH), and the uplink shared channel may be a physical uplink shared channel (PUSCH). Additionally, or alternatively, the UE 115-a may transmit a data message 220 to the BS 105-a over the uplink shared channel.

In some examples, the BS 105-a may perform channel estimation based on the reference signals 215. The channel estimation may involve one or more measurements and calculations at the BS 105-a based on characteristics of the reference signals 215, such as a received power. UE 115-a may transmit the reference signals 215 within a transport block (TB) 225, which may include one or more RBs 230. For example, the TB 225 may be split into RB 230-a and RB 230-b, as well as additional RBs 230. Each RB 230 may include one or more sets of time-frequency resources, such as multiple sub-carriers over a slot in time. Each set of time-frequency resources may be referred to as code block (CB) 235. In some implementations, the UE 115-a may transmit a reference signal 215 in a same RB 230 as a data message 220. For example, the UE 115-a may transmit a reference signal 215 in a CB 235 of RB 230-a and a data message 220 in one or more additional CBs 235 of RB 230-a. Similarly, the UE 115-a may transmit a reference signal 215 in a CB 235 of RB 230-b and a data message 220 in one or more additional CBs 235 of RB 230-b. In some other implementations, the UE 115-a may transmit reference signals 215 in a different RB 230 than a data message 230. In some examples, the reference signals 215 may include DMRSs, phase noise tracking reference signals (PTRSs), or the like.

In some examples, the UE 115-a may spread a data transmission across multiple RBs 230 or may repeat the data transmission across RBs 230. For example, the one or more data messages 220 for RB 230-a and the data messages 220 for RB 230-b may be a repetition of a data transmission or a portion of the data transmission. In some examples, the BS 105-a may perform a joint channel estimation procedure based on the UE 115-a splitting the data transmission or repeating the data transmission across the RBs 230. For example, the BS 105-a may perform DMRS bundling, phase noise tracking, or both for the reference signals 215 from RB 230-a and RB 230-b on an uplink channel, such as a PUSCH or PUCCH.

In some examples, the UE 115-a may support the joint channel estimation if the UE 115-a is capable of transmitting the reference signals across multiple RBs 230 while maintaining a phase continuity. That is, whether the UE 115-a supports DMRS bundling, phase noise tracking, or both for a PUSCH or PUCCH depends on a UE capability associated with phase continuity maintenance. In some implementations, a resource gap 240 between RBs 230 may affect whether the UE 115-a supports phase continuity maintenance. For example, the capability of the UE 115-a to maintain a phase continuity may be based on whether an uplink transmission, such as a PUSCH transmission or PUCCH transmission, is contiguous or not. If the uplink transmission is not contiguous, the UE capability may depend on how large the gap 240 is relative to a length in time, a size in frequency, or the usage of the gap 240.

In some implementations, the BS 105-a may perform wideband estimation, or joint channel estimation, of the relative phase between transmission slots. For example, the BS 105-a may perform joint channel estimation if the UE 115-a maintains the relative phase among different RBs 230, such as between RB 230-a and RB 230-b, during the time window that BS 105-a uses for the joint channel estimation, which is described in further detail with respect to FIG. 3. Additionally, or alternatively, the UE 115-a may attempt to maintain a transmit power for data messages 220, such as data messages 220 for RB 230-a and data messages 220 for RB 230-b, such that the BS 105-a may perform joint channel estimation. However, the BS 105-a may be unaware of a capability of the UE 115-a to maintain a transmit power, maintain a phase continuity, or both when determining whether to perform a joint channel estimation procedure, such as for receiving an uplink transmission.

In some examples, the UE 115-a may generate or otherwise determine UE capability information related to a capability of UE 115-a to maintain a transmission continuity. The UE 115-a may transmit the transmission continuity capability information 245 to BS 105-a. In some implementations, UE 115-a may indicate one among multiple categories of transmission continuity capability, such as uplink transmission continuity capability, in the transmission continuity capability information 245 depending on a parameter of continuity, an accuracy of continuity, or both. The options may include an indication that the UE 115-a does not support transmission continuity. For example, U the E 115-a may be incapable of maintaining the transmission continuity or transmission power across RBs 230, such as if a gap 240 becomes large enough to surpass a threshold for transmission continuity at the UE 115-a.

In some examples, at 250, the UE 115-a may perform one or more continuity measurements. The UE 115-a may perform the continuity measurements over multiple slots, multiple segments of a data transmission, or both for an uplink channel or a repetition of an uplink channel, such as a PUSCH or PUCCH. In some examples, there may be multiple categories of a transmission continuity capability for the UE 115-a. The categories may be related to a parameter of continuity, such as an RF phase, an uplink transmit power, a relative RF phase for different RBs 230, or a combination, or an accuracy of continuity. In some implementations, the categories may be configured by BS 105-a, preconfigured by a network, or preset at the UE 115-a. In some examples, the transmission continuity information 245 may include an indication of an index of a category of a transmission continuity capability supported by UE 115-a. BS 105-a may determine the capability of UE 115-a to maintaining a transmission continuity based on the category indicated by the index. In some other examples, the UE 115-a may explicitly report the one or more continuity measurements to BS 105-a, such as in terms of a phase resolution.

In some examples, the continuity measurements may include a maximum RF phase difference between uplink channel repetitions on the same frequency resources, a maximum phase difference between uplink channel repetitions on different frequency resources, a maximum uplink transmit power difference between uplink channel repetitions, a maximum relative RF phase difference between uplink channel repetitions for different RBs 230, or a combination thereof. A maximum RF phase difference may depend on the transmit power or a difference, such as a decibel (dB) difference, to a maximum transport power, a power headroom, the distance of resources for the uplink channel repetitions in frequency, or a combination thereof. The continuity measurements may be conditioned on a maximum frequency distance between RBs 230 or presented as a function of frequency distance between RBs 230.

In some implementations, there may be a hierarchy or partial hierarchy of transmission continuity capabilities for the UE 115-a. For example, if the UE 115-a indicates a higher capability in the transmission continuity capability information 245, the BS 105-a may infer the UE 115-a supports lower capabilities as well. That is, an indication of the higher capability may implicitly indicate the lower capability. In some examples, the UE 115-a may dynamically indicate a change in its capability to the BS 105-a, such as in an uplink control information (UCI) message, or other form of control signaling. For example, if the UE 115-a lowers a power consumption value, the UE 115-a may operate according to reduced transmission continuity capability to reduce processing complexity. The UE 115-a may transmit additional transmission continuity capability information 245 to the BS 105-a to indicate the reduced transmission continuity capability.

Figure 3:
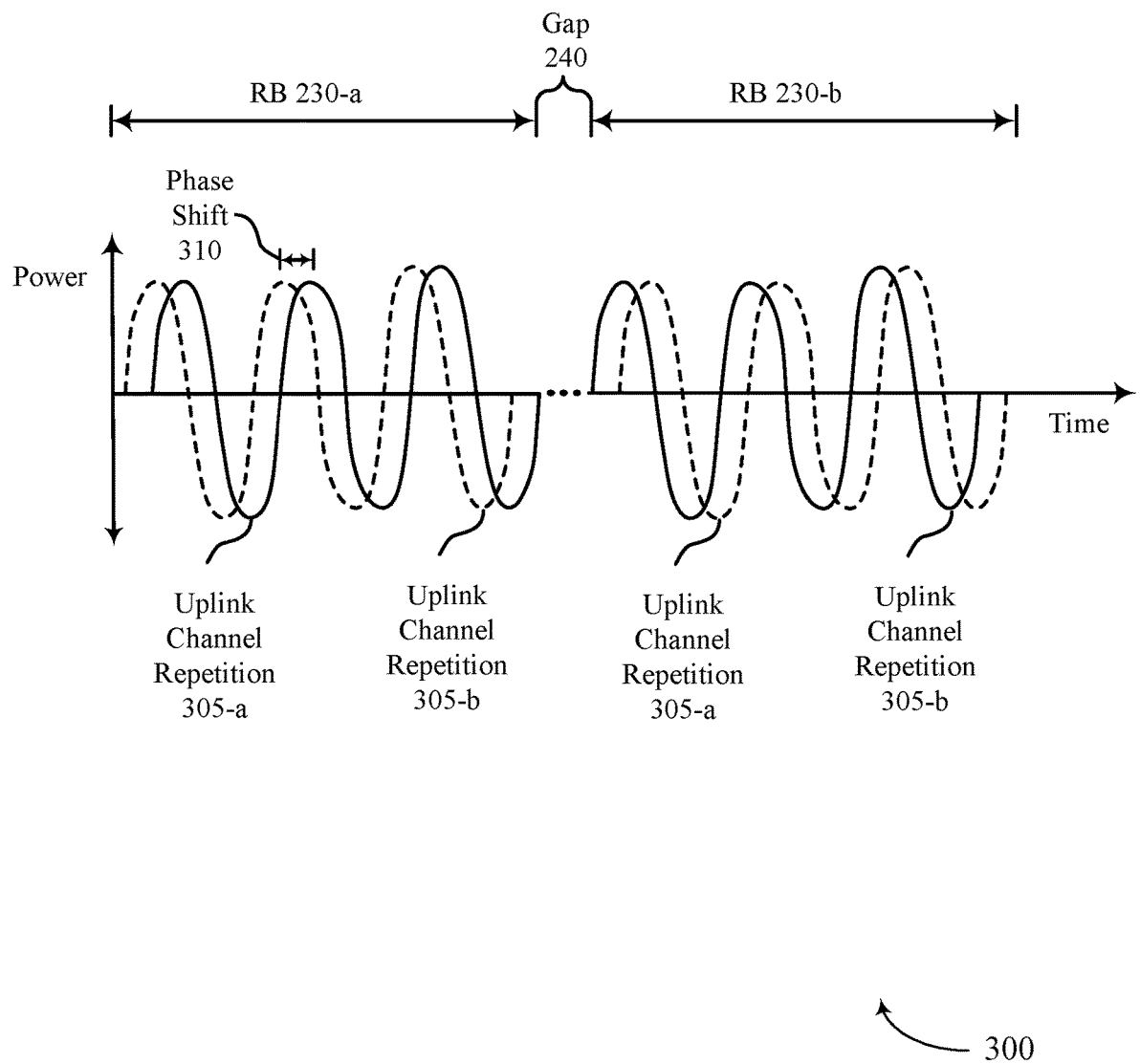
FIG. 3 illustrates an example of a resource diagram that supports transmission continuity capability reporting.

FIG. 3 illustrates an example of a resource diagram 300 that supports transmission continuity capability reporting. The resource diagram 300 may illustrate operational aspects of the wireless communication system 100 of FIG. 1 and the signaling diagram 200 of FIG. 2. For example, the resource diagram 300 may be implemented by a UE 115, a BS 105, or both. In some implementations, a UE 115 may perform one or more uplink transmissions to a BS 105 based on a transmission continuity capability of the UE 115. For example, the UE 115 may transmit one or more reference signals, data messages, or both to the BS 105 using one or more RBs 230, as described with reference to FIG. 2.

In some implementations, the UE 115 may transmit one or more uplink transmissions over an uplink channel, such as a PUSCH or PUCCH, according to a waveform. In some examples, the UE 115 may divide the uplink transmission across resource blocks or may transmit one or more uplink channel repetitions 305 to the BS 105. For example, the UE 115 may transmit uplink channel repetition 305-a during a time interval, such as a slot, for RB 230-a with a waveform. Similarly, the UE 115 may transmit uplink channel repetition 305-b during a different time interval, such as another slot, for RB 230-b with another waveform. The waveforms may be based on a transmit power of the UE 115, channel characteristics, environmental factors, and more.

In some examples, the UE 115 may determine a transmission continuity capability to report to the BS 105. For example, the UE 115 may determine whether a gap 240 between RBs 230, such as RB 230-*a* and RB 230-*b*, satisfies a threshold value. The threshold value may be based on whether the UE 115 may transmit uplink channel repletion 305-*a* and the uplink channel repetition 305-*b* within a transmit power threshold and within a phase shift threshold for a phase shift 310. The phase shift 310 may be based on the waveform the UE 115 uses to transmit uplink channel repetition 305-*a* and uplink channel repetition 305-*b*. The transmission continuity capability reported to the BS 105 may be based on whether the gap 240 satisfies the threshold value.

In some implementations, the BS 105 may perform joint channel estimation of a phase shift 310 for an uplink channel repetition 305 between transmission slots. For example, the BS 105 may perform joint channel estimation if the UE 115 maintains the phase shift 310 below a threshold variation among different RBs 230, such as between RB 230-*a* and RB 230-*b*, during the time window that the BS 105 uses for the joint channel estimation. In some examples, the BS 105 may determine the threshold variation. In some other examples, the UE 115 may determine the threshold variation of phase shift 310 based on performing one or more continuity measurements and comparing the values to a category for transmission continuity capability, as described with reference to FIG. 2. In some implementations, the UE 115 may attempt to maintain a transmit power for data messages for RB 230-*a* and data messages for RB 230-*b* according to a transmission continuity capability of the UE 115. The UE 115 may indicate the transmission continuity to the BS 105 so the BS 105 may perform joint channel estimation.

Figure 4:
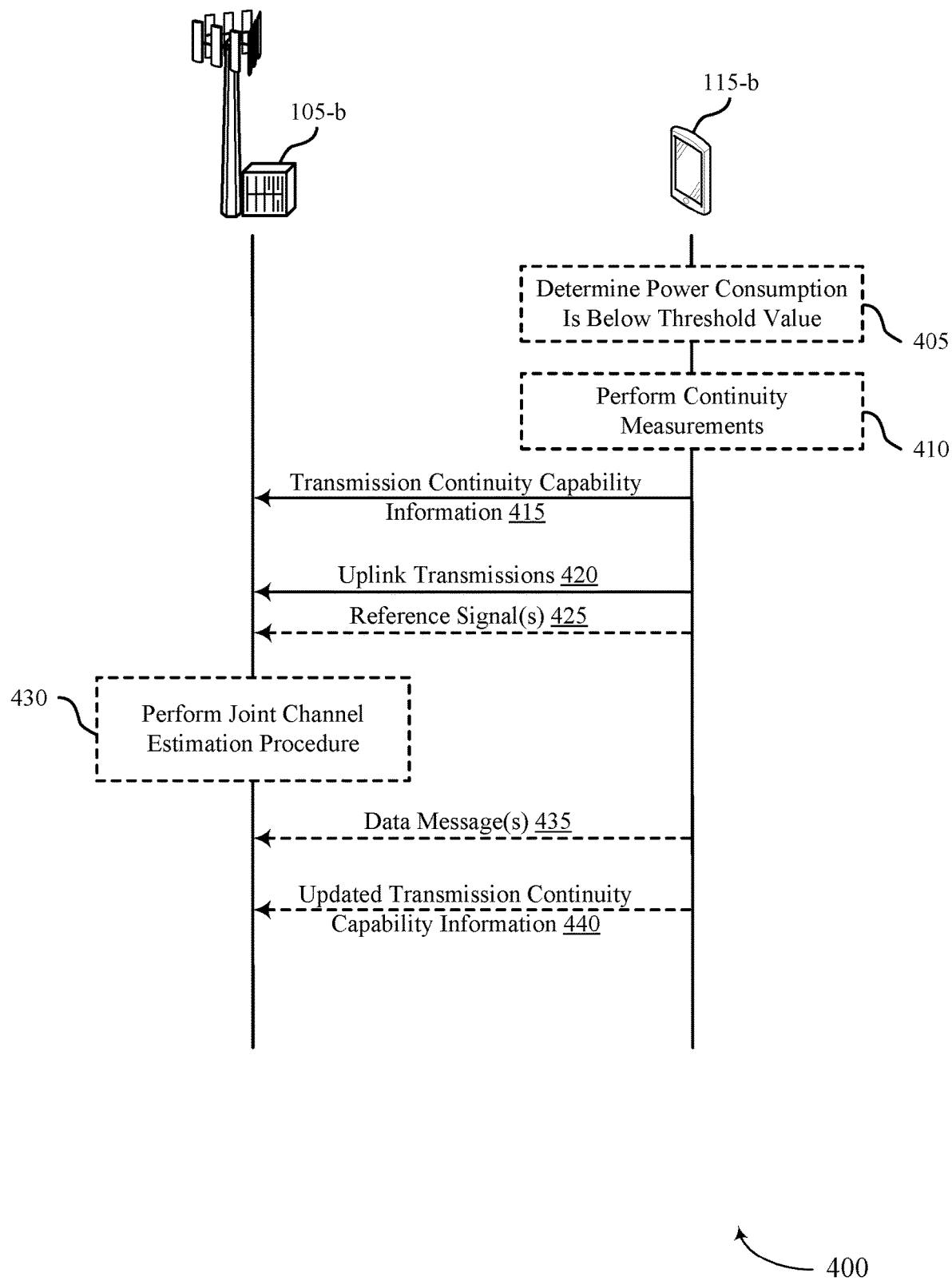
FIG. 4 illustrates an example of a process flow that supports transmission continuity capability reporting.

FIG. 4 illustrates an example of a process flow 400 that supports transmission continuity capability reporting. In some implementations, process flow 400 may implement aspects of wireless communications system 100, signaling diagram 200, resource diagram 300, or a combination thereof. The process flow 400 may illustrate an example of a UE 115, such as UE 115-*b*, transmitting an indication of a supported transmission continuity capability. One or more components of a BS 105, such as BS 105-*b*, may perform one or more joint channel estimations based on the transmission continuity capability of the UE 115. Alternative examples of the following may be implemented, where some processes are performed in a different order than described or are not performed. In some implementations, processes may include additional features not mentioned below, or further processes may be added.

At 405, the UE 115-*b* may determine a power consumption at the UE 115-*b* is below a threshold value.

At 410, the UE 115-*b* may perform one or more continuity measurements to determine a continuity capability of the UE 115-*b*. In some examples, the UE 115-*b* may perform the one or more continuity measurements based on determining the power consumption is below the threshold value. In some examples, the measurements may involve determining a maximum value for an RF phase difference between one or more repetitions of a wireless channel, such as a PUSCH or PUCCH, on a set of same frequency resources, between the repetitions on a set of different frequency resources, between the repetitions for each RB, between a one or more transmit powers for the repetitions, based on a distance between the RBs, such as a gap, based on a power headroom, based on a location of a set of frequency resources for the repetitions, or a combination thereof.

In some examples, the UE 115-*b* may generate a function for frequency difference between RBs for one or more uplink transmissions based on a maximum frequency distance between the RBs.

At 415, the UE 115-*b* may send transmission continuity capability information to the BS 105-*b*. The transmission continuity capability information may indicate to the BS 105-*b* the capability of the UE 115-*b* to maintain a transmission continuity across RBs for a transmission or one or more repetitions of a wireless channel, such as the PUSCH or PUCCH. The transmission continuity capability information may include one or more of a phase continuity or an amplitude continuity for uplink transmissions across slots. The transmission continuity capability information may indicate the maximum value for the RF phase difference measured at 410. In some examples, the UE 115-*b* may send the transmission continuity capability information via control signaling, such as an UCI message, RRC signaling, a MAC-CE, or the like. For example, the UE 115-*b* may include the capability information in a capability message carrying other UE capability information or may transmit an additional capability message to the BS 105-*b*.

In some examples, the phase continuity capability information may include an index for a category of uplink transmission continuity capability. The index may point to the category in a predetermined list of uplink transmission continuity capabilities. The list may be configured by the BS 105-*b*, by a network entity, or may be preconfigured at the UE 115-*b*. In some other examples, the UE 115-*b* may transmit an explicit indication of the transmission continuity capability supported by the UE 115-*b*. For example, the UE 115-*b* may transmit a phase resolution value for the one or more uplink transmissions to the BS 105-*b*. Additionally, or alternatively, the transmission continuity capability information may include an RF phase, an uplink transmit power, a relative RF phase for RBs, or a combination thereof. In some implementations, the transmission continuity capability information may indicate the function for frequency difference between RBs for the one or more uplink transmissions.

At 420, the UE 115-*b* may transmit the one or more uplink transmissions to the BS 105-*b* over the wireless channel in accordance with the uplink transmission continuity capability of the UE 115-*b*. The one or more uplink transmissions may include one or more reference signals, one or more data messages, or both, and may be divided across multiple RBs, each RB transmitted during a slot.

For example, at 420, the UE 115-*b* may transmit the one or more reference signals to the BS 105-*b*. The reference signals may include one or more DMRSs, PTRSs, or the like. The BS 105-*b* may receive the reference signals prior to receiving the one or more data messages.

Thus, at 430, BS 105-*b* may perform a channel estimation for the wireless channel based on the reference signals. For example, the BS 105-*b* may perform a joint channel estimation procedure, including DMRS bundling, phase noise tracking, or both, for the one or more reference signals across multiple slots or RBs. The decision to perform the channel estimation procedure or to leverage a specific feature of the channel estimation procedure, such as DMRS bundling, phase noise tracking, or both, may be according to the transmission continuity capability information provided by the UE 115-*b*.

At 435, the UE 115-*b* may transmit one or more data messages to the BS 105-*b* within the one or more uplink transmissions. The BS 105-*b* may receive the data messages based on performing the joint channel estimation procedure at 430.

At 440, the UE 115-*b* may update the transmission continuity capability information based on a change in power consumption at the UE 115-*b*. The UE 115-*b* may send an indication of the updated transmission continuity capability information in control signaling to the BS 105-*b*, such as dynamic control signaling.

In some examples, the transmission continuity capability information or the updated transmission continuity capability information may be a hierarchical or partially hierarchical. For example, if the UE 115-*b* indicates a higher capability in the transmission continuity capability information at 415 or at 420, the BS 105-*b* may infer the UE 115-*b* supports lower capabilities as well. That is, an indication of the higher capability may implicitly indicate the lower capability.

Figure 5:
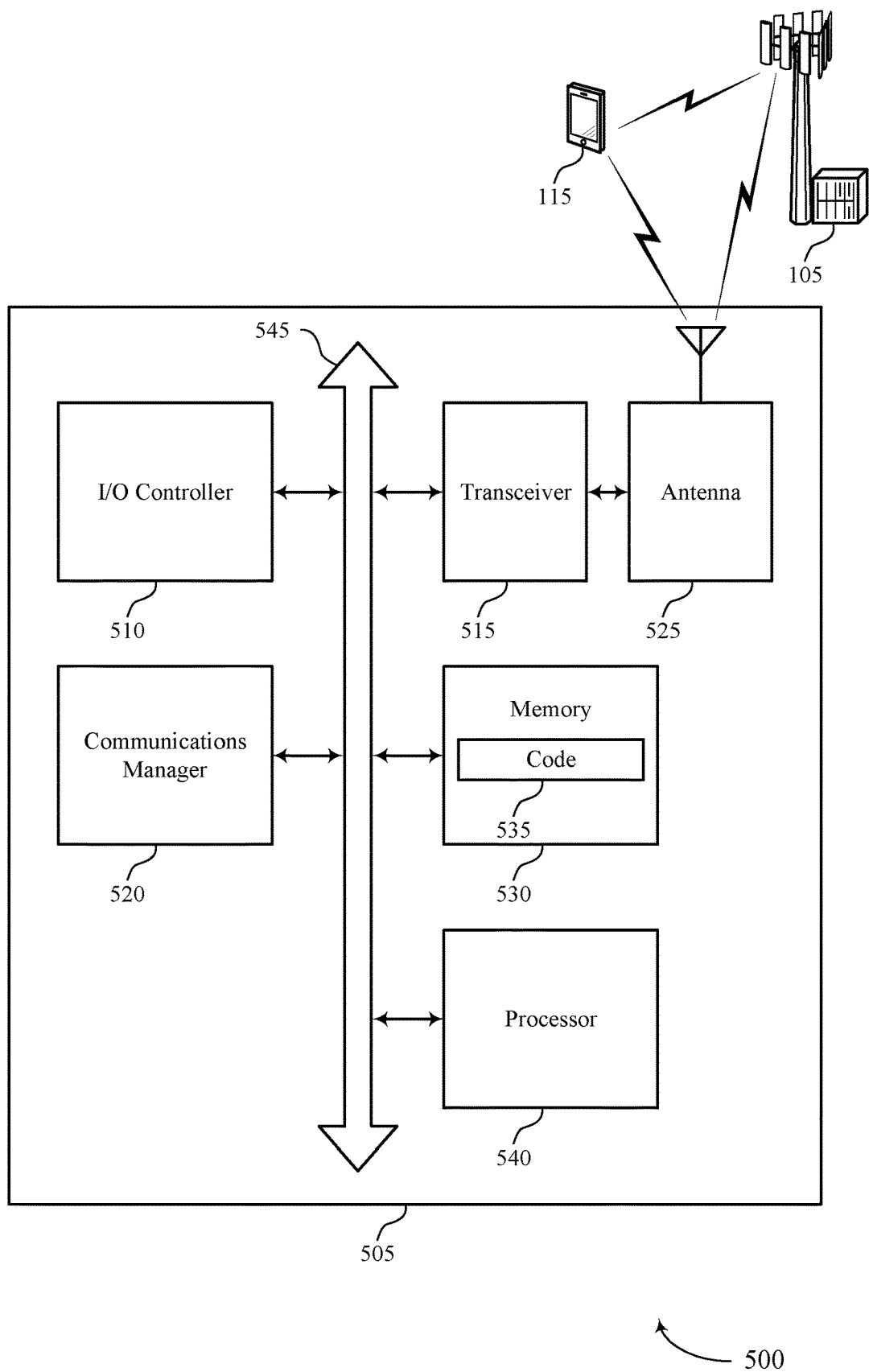
FIG. 5 shows a diagram of an example system including a device that supports transmission continuity capability reporting.

FIG. 5 shows a diagram of an example system 500 including a device 505 that supports transmission continuity capability reporting. The device 505 may communicate wirelessly with one or more components of one or more BSs 105, UEs 115, or any combination thereof. The device 505 may include components for bi-directional voice and data communications including components for transmitting and receiving communications, such as a communications manager 520, an input/output (I/O) controller 510, a transceiver 515, an antenna 525, a memory 530, code 535, and a processor 540. These components may be in electronic communication or otherwise coupled (such as operatively, communicatively, functionally, electronically, electrically) via one or more buses (such as a bus 545).

The I/O controller 510 may manage input and output signals for the device 505. The I/O controller 510 also may manage peripherals not integrated into the device 505. In some implementations, the I/O controller 510 may represent a physical connection or port to an external peripheral. In some implementations, the I/O controller 510 may utilize an operating system such as iOS®, ANDROID®, MS-DOS®, MS-WINDOWS®, OS/2®, UNIX®, LINUX®, or another known operating system. Additionally, or alternatively, the I/O controller 510 may represent or interact with a modem, a keyboard, a mouse, a touchscreen, or a similar device. In some implementations, the I/O controller 510 may be implemented as part of a processor, such as the processor 540. In some implementations, a user may interact with the device 505 via the I/O controller 510 or via hardware components controlled by the I/O controller 510.

In some implementations, the device 505 may include a single antenna 525. However, in some other cases, the device 505 may have more than one antenna 525, which may be capable of concurrently transmitting or receiving multiple wireless transmissions. The transceiver 515 may communicate bi-directionally, via the one or more antennas 525, wired, or wireless links as described herein. For example, the transceiver 515 may represent a wireless transceiver and may communicate bi-directionally with another wireless transceiver. The transceiver 515 also may include a modem to modulate the packets, to provide the modulated packets to one or more antennas 525 for transmission, and to demodulate packets received from the one or more antennas 525. The transceiver 515, or the transceiver 515 and one or more antennas 525, may be an example of a transmitter, a receiver, or any combination thereof or component thereof, as described herein.

The memory 530 may include random access memory (RAM) and read-only memory (ROM). The memory 530 may store computer-readable, computer-executable code 535 including instructions that, when executed by the processor 540, cause the device 505 to perform various functions described herein. The code 535 may be stored in a non-transitory computer-readable medium such as system memory or another type of memory. In some implementations, the code 535 may not be directly executable by the processor 540 but may cause a computer (such as when compiled and executed) to perform functions described herein. In some implementations, the memory 530 may contain, among other things, a basic I/O system (BIOS) which may control basic hardware or software operation such as the interaction with peripheral components or devices.

The processor 540 may include an intelligent hardware device (such as a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some implementations, the processor 540 may be configured to operate a memory array using a memory controller. In some other cases, a memory controller may be integrated into the processor 540. The processor 540 may be configured to execute computer-readable instructions stored in a memory (such as the memory 530) to cause the device 505 to perform various functions (such as functions or tasks supporting transmission continuity capability reporting). For example, the device 505 or a component of the device 505 may include a processor 540 and memory 530 coupled to the processor 540, the processor 540 and memory 530 configured to perform various functions described herein.

The communications manager 520 may support wireless communications at a UE in accordance with examples as disclosed herein. For example, the communications manager 520 may be configured as or otherwise support a means for transmitting UE capability information including an indication of an uplink transmission continuity capability of the UE to a BS, where the uplink transmission continuity capability includes one or more of a phase continuity or an amplitude continuity associated with slots for one or more uplink transmissions. The communications manager 520 may be configured as or otherwise support a means for transmitting the one or more uplink transmissions to the BS over a wireless channel in accordance with the uplink transmission continuity capability of the UE.

In some examples, the communications manager 520 may be configured to perform various operations (such as receiving, monitoring, transmitting) using or otherwise in cooperation with the transceiver 515, the one or more antennas 525, or any combination thereof. Although the communications manager 520 is illustrated as a separate component, in some examples, one or more functions described with reference to the communications manager 520 may be supported by or performed by the processor 540, the memory 530, the code 535, or any combination thereof. For example, the code 535 may include instructions executable by the processor 540 to cause the device 505 to perform various aspects of transmission continuity capability reporting as described herein, or the processor 540 and the memory 530 may be otherwise configured to perform or support such operations.

Figure 6:
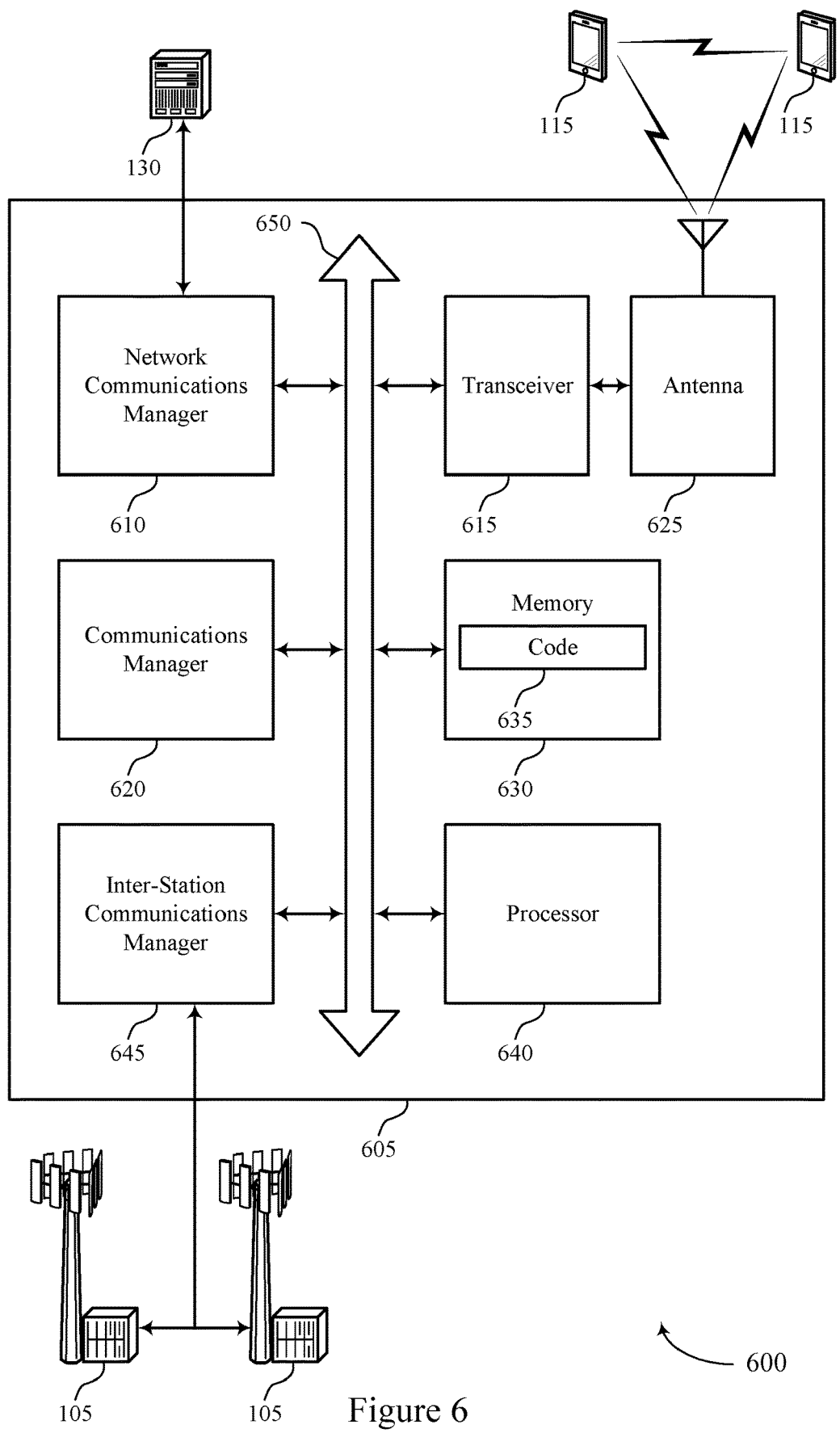
FIG. 6 shows a diagram of an example system including a device that supports transmission continuity capability reporting.

FIG. 6 shows a diagram of an example system 600 including a device 605 that supports transmission continuity capability reporting. The device 605 may communicate wirelessly with one or more components of one or more BSs 105, UEs 115, or any combination thereof. The device 605 may include components for bi-directional voice and data communications including components for transmitting and receiving communications, such as a communications manager 620, a network communications manager 610, a transceiver 615, an antenna 625, a memory 630, code 635, a processor 640, and an inter-station communications manager 645. These components may be in electronic communication or otherwise coupled (such as operatively, communicatively, functionally, electronically, electrically) via one or more buses (such as a bus 650).

The network communications manager 610 may manage communications with a core network 130 (such as via one or more wired backhaul links). For example, the network communications manager 610 may manage the transfer of data communications for client devices, such as one or more UEs 115.

In some implementations, the device 605 may include a single antenna 625. However, in some other cases the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625. The transceiver 615, or the transceiver 615 and one or more antennas 625, may be an example of a transmitter, a receiver, or any combination thereof or component thereof, as described herein.

The memory 630 may include RAM and ROM. The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some implementations, the code 635 may not be directly executable by the processor 640 but may cause a computer (such as when compiled and executed) to perform functions described herein. In some implementations, the memory 630 may contain, among other things, a BIOS which may control basic hardware or software operation such as the interaction with peripheral components or devices.

The processor 640 may be any one or more suitable processors capable of executing scripts or instructions of one or more software programs stored in the device 605 (such as within the memory 630). In some implementations, the processor 640 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605.

The processing system of the device 605 may interface with other components of the device 605, and may process information received from other components (such as inputs or signals) or output information to other components. For example, a chip or modem of the device 605 may include a processing system, a first interface to output information, and a second interface to obtain information. In some implementations, the first interface may refer to an interface between the processing system of the chip or modem and a transmitter, such that the device 605 may transmit information output from the chip or modem. In some implementations, the second interface may refer to an interface between the processing system of the chip or modem and a receiver, such that the device 605 may obtain information or signal inputs, and the information may be passed to the processing system. A person having ordinary skill in the art will readily recognize that the first interface also may obtain information or signal inputs, and the second interface also may output information or signal outputs.

The inter-station communications manager 645 may manage communications with other BSs 105, and may include a controller or scheduler for controlling communications with UEs 115 in cooperation with other BSs 105. For example, the inter-station communications manager 645 may coordinate scheduling for transmissions to UEs 115 for various interference mitigation techniques such as beamforming or joint transmission. In some examples, the inter-station communications manager 645 may provide an X2 interface within an LTE/LTE-A wireless communications network technology to provide communication between BSs 105.

The communications manager 620 may support wireless communications at an apparatus of a BS in accordance with examples as disclosed herein. For example, the communications manager 620 may be configured as or otherwise support a means for obtaining UE capability information including an indication of an uplink transmission continuity capability of the UE), where the uplink transmission continuity capability includes one or more of a phase continuity or an amplitude continuity associated with slots for one or more uplink transmissions. The communications manager 620 may be configured as or otherwise support a means for obtaining the one or more uplink transmissions over a wireless channel in accordance with the uplink transmission continuity capability of the UE. The communications manager 620 may be configured as or otherwise support a means for performing channel estimation for the wireless channel based on obtaining the one or more uplink transmissions.

In some examples, the communications manager 620 may be configured to perform various operations (such as receiving, monitoring, transmitting) using or otherwise in cooperation with the transceiver 615, the one or more antennas 625, or any combination thereof. Although the communications manager 620 is illustrated as a separate component, in some examples, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of transmission continuity capability reporting as described herein, or the processor 640 and the memory 630 may be otherwise configured to perform or support such operations.

Figure 7:
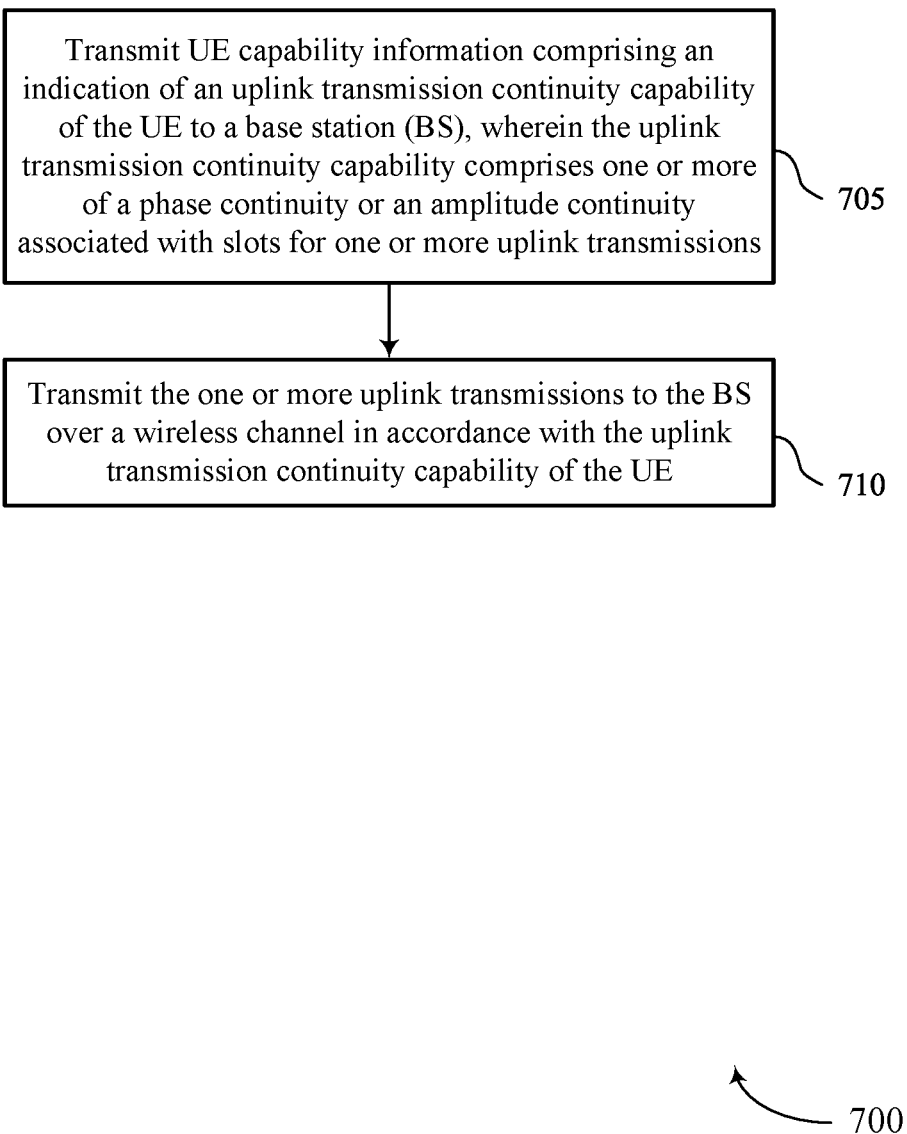
FIGS. 7-10 show flowcharts illustrating example methods that support transmission continuity capability reporting.

FIG. 7 shows a flowchart illustrating an example method 700 that supports transmission continuity capability reporting. The operations of the method 700 may be implemented by a UE or its components as described herein. For example, the operations of the method 700 may be performed by a UE 115 as described with reference to FIGS. 1-5. In some examples, a UE may execute a set of instructions to control the functional elements of the UE to perform the described functions. Additionally, or alternatively, the UE may perform aspects of the described functions using special-purpose hardware.

At 705, the method may include transmitting UE capability information including an indication of an uplink transmission continuity capability of the UE to one or more components of a BS, where the uplink transmission continuity capability includes one or more of a phase continuity or an amplitude continuity associated with slots for one or more uplink transmissions. The operations of 705 may be performed in accordance with examples as disclosed herein.

At 710, the method may include transmitting the one or more uplink transmissions to the BS over a wireless channel in accordance with the uplink transmission continuity capability of the UE. The operations of 710 may be performed in accordance with examples as disclosed herein.

Figure 8:
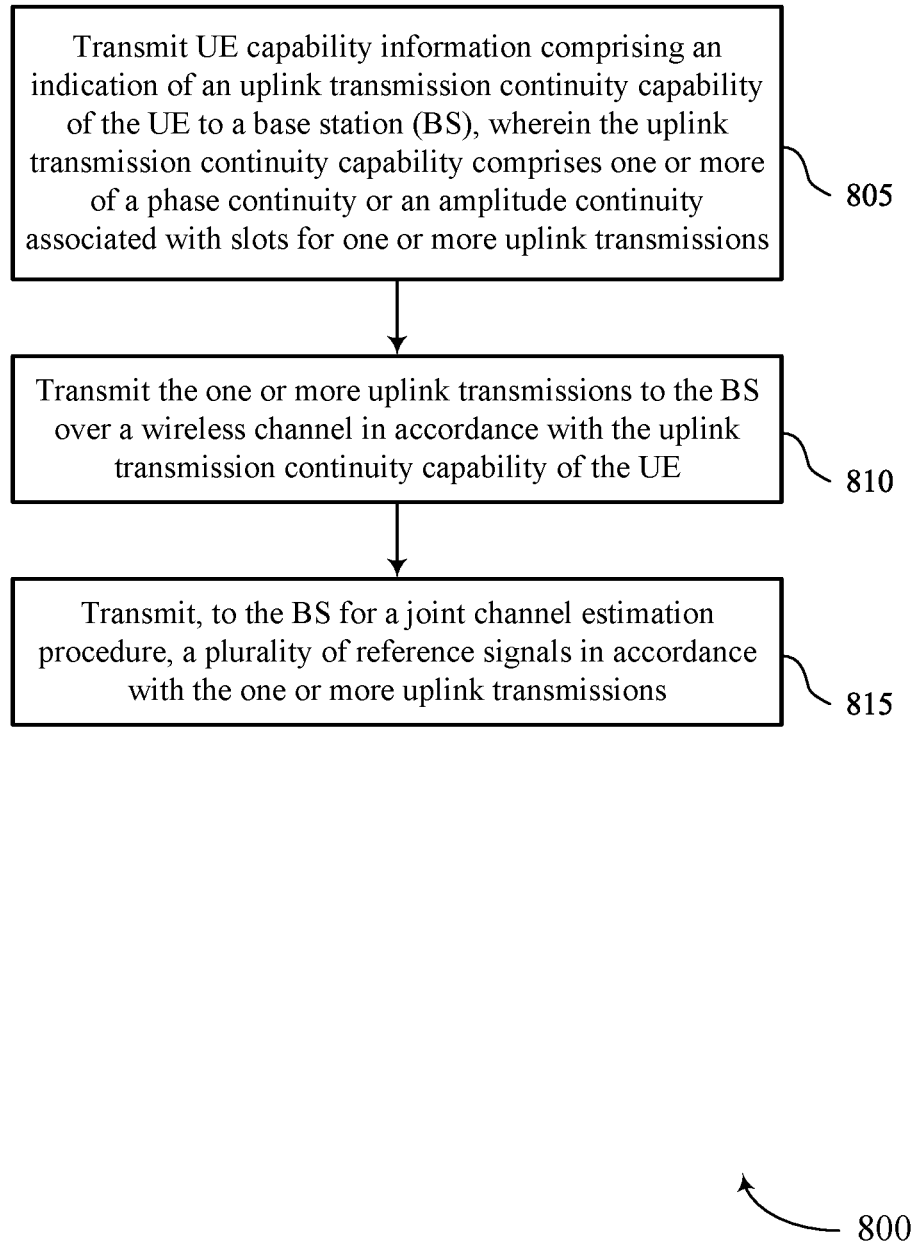

FIG. 8 shows a flowchart illustrating an example method 800 that supports transmission continuity capability reporting. The operations of the method 800 may be implemented by a UE or its components as described herein. For example, the operations of the method 800 may be performed by a UE 115 as described with reference to FIGS. 1-5. In some examples, a UE may execute a set of instructions to control the functional elements of the UE to perform the described functions. Additionally, or alternatively, the UE may perform aspects of the described functions using special-purpose hardware.

At 805, the method may include transmitting UE capability information including an indication of an uplink transmission continuity capability of the UE to a BS, where the uplink transmission continuity capability includes one or more of a phase continuity or an amplitude continuity associated with slots for one or more uplink transmissions. The operations of 805 may be performed in accordance with examples as disclosed herein.

At 810, the method may include transmitting the one or more uplink transmissions to the BS over a wireless channel in accordance with the uplink transmission continuity capability of the UE. The operations of 810 may be performed in accordance with examples as disclosed herein.

At 815, the method may include transmitting, to the BS for a joint channel estimation procedure, a set of multiple reference signals in accordance with the one or more uplink transmissions. The operations of 815 may be performed in accordance with examples as disclosed herein.

Figure 9:
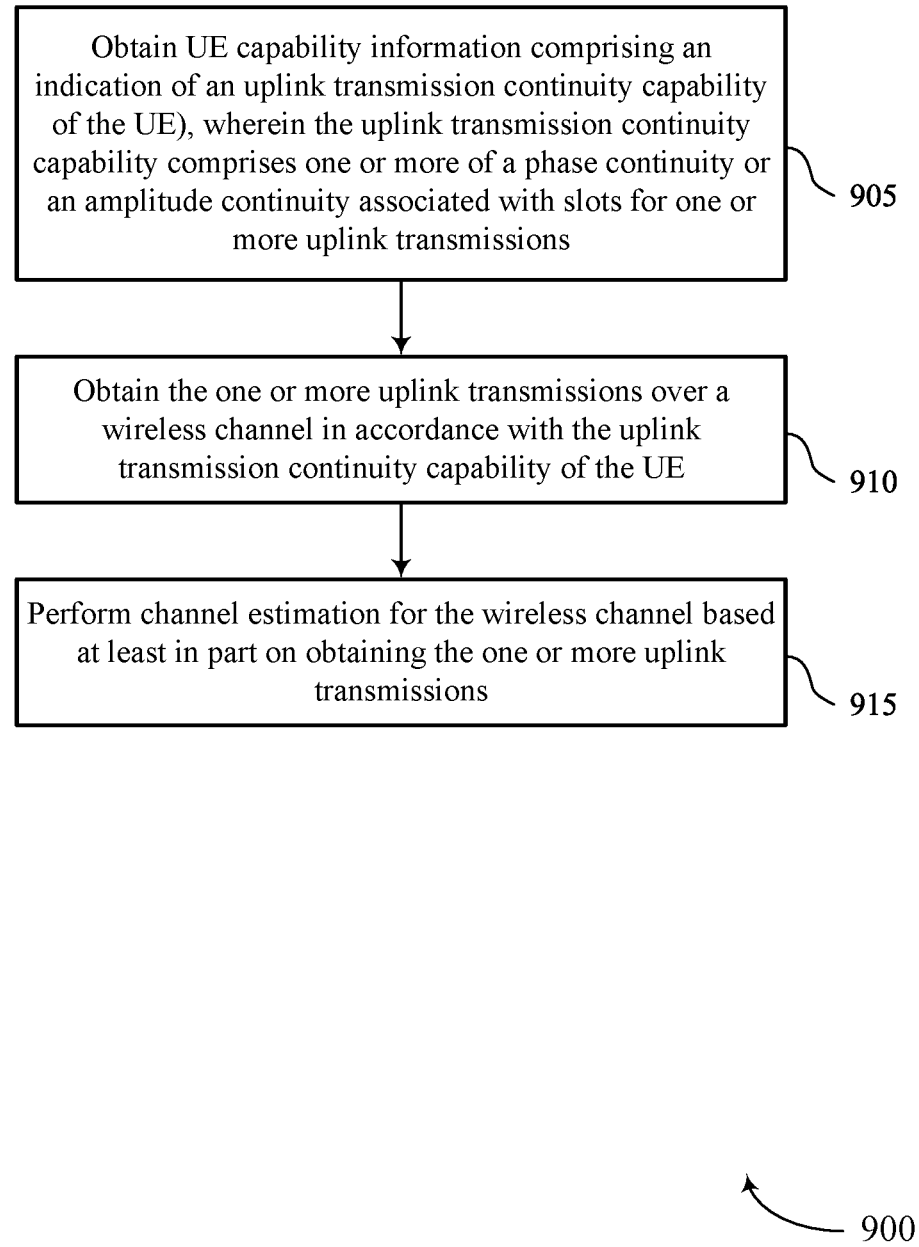

FIG. 9 shows a flowchart illustrating an example method 900 that supports transmission continuity capability reporting. The operations of the method 900 may be implemented by a BS or one or more of its components as described herein. For example, the operations of the method 900 may be performed by a BS 105 as described with reference to FIGS. 1-4 and 6. In some examples, a BS may execute a set of instructions to control the functional elements of the BS to perform the described functions. Additionally, or alternatively, the BS may perform aspects of the described functions using special-purpose hardware.

At 905, the method may include obtaining UE capability information including an indication of an uplink transmission continuity capability of the UE), where the uplink transmission continuity capability includes one or more of a phase continuity or an amplitude continuity associated with slots for one or more uplink transmissions. The operations of 905 may be performed in accordance with examples as disclosed herein.

At 910, the method may include obtaining the one or more uplink transmissions over a wireless channel in accordance with the uplink transmission continuity capability of the UE. The operations of 910 may be performed in accordance with examples as disclosed herein.

At 915, the method may include performing channel estimation for the wireless channel based on obtaining the one or more uplink transmissions. The operations of 915 may be performed in accordance with examples as disclosed herein.

Figure 10:
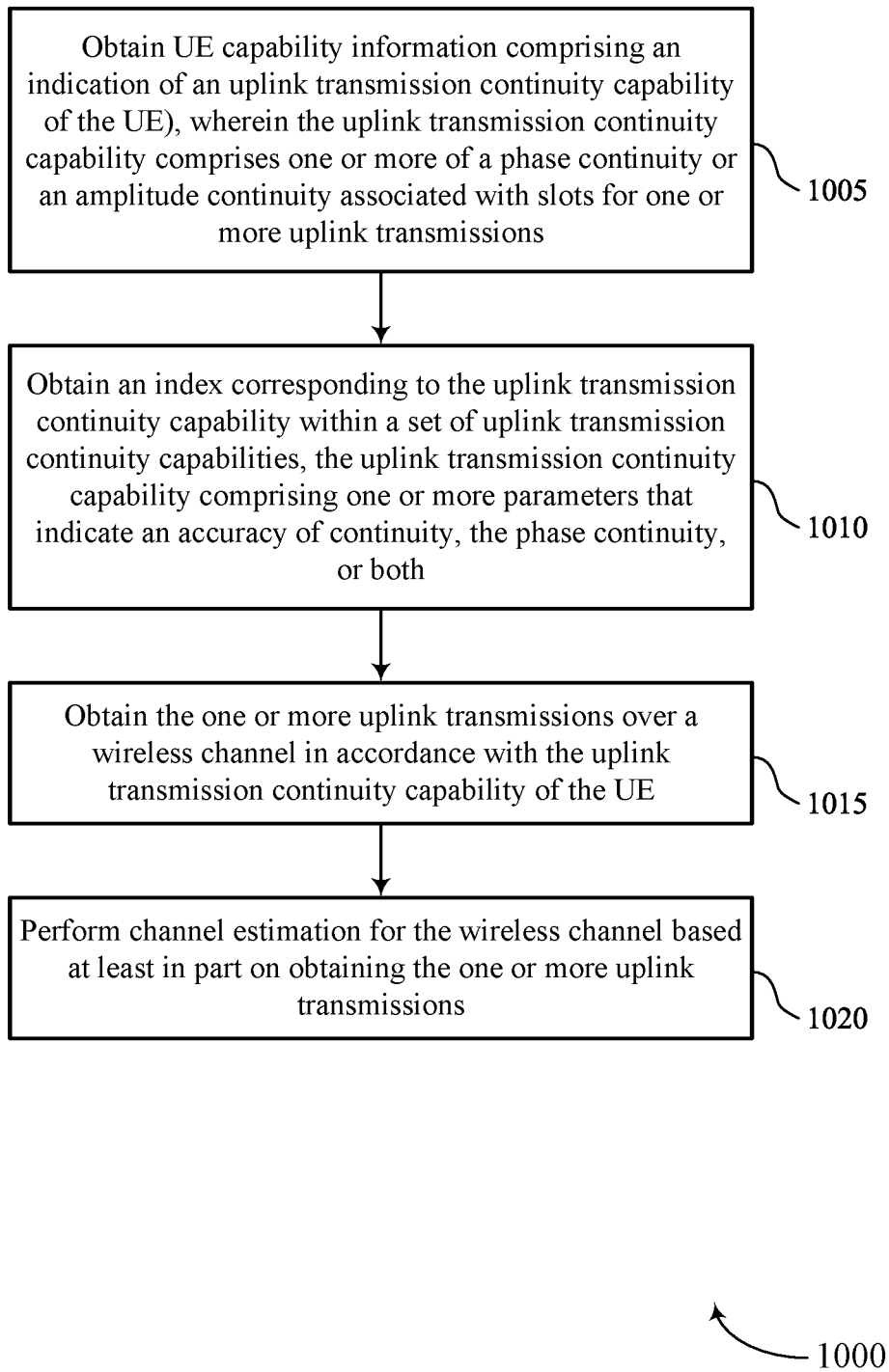

FIG. 10 shows a flowchart illustrating an example method 1000 that supports transmission continuity capability reporting. The operations of the method 1000 may be implemented by a BS or one or more of its components as described herein. For example, the operations of the method 1000 may be performed by a BS 105 as described with reference to FIGS. 1-4 and 6. In some examples, a BS may execute a set of instructions to control the functional elements of the BS to perform the described functions. Additionally, or alternatively, the BS may perform aspects of the described functions using special-purpose hardware.

At 1005, the method may include obtaining UE capability information including an indication of an uplink transmission continuity capability of the UE), where the uplink transmission continuity capability includes one or more of a phase continuity or an amplitude continuity associated with slots for one or more uplink transmissions. The operations of 1005 may be performed in accordance with examples as disclosed herein.

At 1010, the method may include obtaining an index corresponding to the uplink transmission continuity capability within a set of uplink transmission continuity capabilities, the uplink transmission continuity capability including one or more parameters that indicate an accuracy of continuity, the phase continuity, or both. The operations of 1010 may be performed in accordance with examples as disclosed herein.

At 1015, the method may include obtaining the one or more uplink transmissions over a wireless channel in accordance with the uplink transmission continuity capability of the UE. The operations of 1015 may be performed in accordance with examples as disclosed herein.

At 1020, the method may include performing channel estimation for the wireless channel based on obtaining the one or more uplink transmissions. The operations of 1020 may be performed in accordance with examples as disclosed herein.

The following provides an overview of some aspects of the present disclosure:

Aspect 1: A method for wireless communications at a UE, including: transmitting UE capability information including an indication of an uplink transmission continuity capability of the UE to a BS, where the uplink transmission continuity capability includes one or more of a phase continuity or an amplitude continuity associated with slots for one or more uplink transmissions; and transmitting the one or more uplink transmissions to the BS over a wireless channel in accordance with the uplink transmission continuity capability of the UE.

Aspect 2: The method of aspect 1, further including: transmitting, to the BS for a joint channel estimation procedure, a plurality of reference signals in accordance with the one or more uplink transmissions.

Aspect 3: The method of aspect 2, where the joint channel estimation procedure includes a DMRS bundling operation, a phase noise tracking operation, or both.

Aspect 4: The method of any of aspects 1 through 3, where transmitting the UE capability information includes: transmitting an index corresponding to the uplink transmission continuity capability within a set of uplink transmission continuity capabilities, the uplink transmission continuity capability including one or more parameters that indicate an accuracy of continuity, the phase continuity, or both.

Aspect 5: The method of any of aspects 1 through 4, where transmitting the UE capability information includes: transmitting a phase resolution value associated with the one or more uplink transmissions to the BS.

Aspect 6: The method of any of aspects 1 through 5, further including: transmitting additional UE capability information indicating an updated uplink transmission continuity capability.

Aspect 7: The method of any of aspects 1 through 6, further including: determining a power consumption at the UE is below a threshold value.

Aspect 8: The method of any of aspects 1 through 7, further including: performing one or more continuity measurements to determine a maximum value for an RF phase difference between a plurality of repetitions of the wireless channel on a set of same frequency resources, between the plurality of repetitions of the wireless channel on a set of different frequency resources, between the plurality of repetitions of the wireless channel for each resource block in of a plurality of resource blocks, between a plurality of transmit powers corresponding to the plurality of repetitions of the wireless channel, based at least in part on a distance between the plurality of RBs, based at least in part on a power headroom, based at least in part on a location of a set of frequency resources for the plurality of repetitions of the wireless channel, or a combination thereof; where the UE capability information indicates the maximum value for the RF phase difference.

Aspect 9: The method of any of aspects 1 through 8, further including: generating a function for frequency difference between a plurality of resource blocks for the one or more uplink transmissions based at least in part on a maximum frequency distance between the plurality of resource blocks, where the UE capability information indicates the function.

Aspect 10: The method of any of aspects 1 through 9, where the UE capability information includes a RF phase, an uplink transmit power, a relative RF phase corresponding to two or more resource blocks, or a combination thereof.

Aspect 11: The method of any of aspects 1 through 10, further including: determining a first uplink transmission continuity capability and a second uplink transmission continuity capability, the uplink transmission continuity capability including the first uplink transmission continuity capability and the second uplink transmission continuity capability.

Aspect 12: An apparatus for wireless communications, including: a first interface, a second interface, and a processing system configured to cause the apparatus to perform a method of any of aspects 1 through 11.

Aspect 13: An apparatus for wireless communications at a UE, including at least one means for performing a method of any of aspects 1 through 11.

Aspect 14: A non-transitory computer-readable medium storing code for wireless communications at a UE, the code including instructions executable by a processor to perform a method of any of aspects 1 through 11.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. An apparatus for wireless communications, comprising:
   a processing system that includes one or more processors and one or more memories coupled with the one or more processors, the processing system configured to cause the apparatus to;
   output user equipment (UE) capability information comprising an indication of an uplink transmission continuity capability of a UE, the uplink transmission continuity capability comprising one or more of a phase continuity or an amplitude continuity associated with slots for one or more uplink transmissions, and the indication of the uplink transmission continuity capability comprising an index of a category of the uplink transmission continuity capability within a plurality of categories of uplink transmission continuity capabilities, the category corresponding to an accuracy of continuity; and
   output the one or more uplink transmissions over a wireless channel in accordance with the uplink transmission continuity capability of the UE.

2. The apparatus of claim 1, wherein the processing system is further configured to cause the apparatus to output, for a joint channel estimation procedure, a plurality of reference signals in accordance with the one or more uplink transmissions.

3. The apparatus of claim 2, wherein the joint channel estimation procedure comprises a demodulation reference signal (DMRS) bundling operation, a phase noise tracking operation, or both.

4. The apparatus of claim 1, wherein the uplink transmission continuity capability comprises one or more parameters that indicate the accuracy of continuity, the phase continuity, or both.

5. The apparatus of claim 1, wherein the processing system is further configured to cause the apparatus to output a phase resolution value associated with the one or more uplink transmissions.

6. The apparatus of claim 1, wherein the processing system is further configured to cause the apparatus to output additional UE capability information indicating an updated uplink transmission continuity capability.

7. The apparatus of claim 1, wherein a power consumption at the UE is below a threshold value.

8. The apparatus of claim 1, wherein the processing system is further configured to cause the apparatus to perform one or more continuity measurements to determine a maximum value for a radio frequency phase difference between a plurality of repetitions of the wireless channel on a plurality of same frequency resources, between the plurality of repetitions of the wireless channel on a plurality of different frequency resources, between the plurality of repetitions of the wireless channel for each resource block in of a plurality of resource blocks, between a plurality of transmit powers corresponding to the plurality of repetitions of the wireless channel, associated with a distance between the plurality of resource blocks, associated with a power headroom, associated with a location of a plurality of frequency resources for the plurality of repetitions of the wireless channel, or a combination thereof, the UE capability information indicating the maximum value for the radio frequency phase difference.

9. The apparatus of claim 1, wherein the processing system is further configured to cause the apparatus to generate a function for frequency difference between a plurality of resource blocks for the one or more uplink transmissions in accordance with a maximum frequency distance between the plurality of resource blocks, the UE capability information indicating the function.

10. The apparatus of claim 1, wherein the uplink transmission continuity capability comprises a first uplink transmission continuity capability and a second uplink transmission continuity capability.

11. An apparatus for wireless communications, comprising:
- a processing system that includes one or more processors and one or more memories coupled with the one or more processors, wherein the processing system is configured to cause the apparatus to:
- obtain user equipment (UE) capability information comprising an indication of an uplink transmission continuity capability of a UE, the uplink transmission continuity capability comprising one or more of a phase continuity or an amplitude continuity associated with slots for one or more uplink transmissions, and the indication of the uplink transmission continuity capability comprising an index of a category of the uplink transmission continuity capability within a plurality of categories of uplink transmission continuity capabilities, the category corresponding to an accuracy of continuity;
- obtain the one or more uplink transmissions over a wireless channel in accordance with the uplink transmission continuity capability of the UE; and
- perform channel estimation for the wireless channel in accordance with obtaining the one or more uplink transmissions.

12. The apparatus of claim 11, wherein:
- the processing system is further configured to cause the apparatus to:
- obtain a plurality of reference signals in accordance with the one or more uplink transmissions; and
- perform a joint channel estimation procedure for the wireless channel using the plurality of reference signals and the UE capability information.

13. The apparatus of claim 12, wherein the joint channel estimation procedure comprises a demodulation reference signal (DMRS) bundling operation, a phase noise tracking operation, or both.

14. The apparatus of claim 11, wherein the uplink transmission continuity capability comprising one or more parameters that indicate the accuracy of continuity, the phase continuity, or both.

15. The apparatus of claim 11, wherein the processing system is further configured to cause the apparatus to obtain a phase resolution value associated with the one or more uplink transmissions.

16. The apparatus of claim 11, wherein:
- the processing system is further configured to cause the apparatus to:
- obtain, from the UE, additional UE capability information indicating an updated uplink transmission continuity capability; and
- perform additional channel estimation for the wireless channel in accordance with obtaining the additional UE capability information.

17. A method for wireless communications at a user equipment (UE), comprising:
- transmitting UE capability information comprising an indication of an uplink transmission continuity capability of the UE, the uplink transmission continuity capability comprising one or more of a phase continuity or an amplitude continuity associated with slots for one or more uplink transmissions transmitted over a wireless channel in accordance with the uplink transmission continuity capability of the UE, and the indication of the uplink transmission continuity capability comprising an index of a category of the uplink transmission continuity capability within a plurality of categories of uplink transmission continuity capabilities, the category corresponding to an accuracy of continuity.

18. The method of claim 17, further comprising transmitting, for a joint channel estimation procedure, a plurality of reference signals in accordance with the one or more uplink transmissions.

19. The method of claim 18, wherein the joint channel estimation procedure comprises a demodulation reference signal (DMRS) bundling operation, a phase noise tracking operation, or both.

20. The method of claim 17, wherein the uplink transmission continuity capability comprises one or more parameters that indicate the accuracy of continuity, the phase continuity, or both.

21. The method of claim 17, wherein transmitting the UE capability information comprises transmitting a phase resolution value associated with the one or more uplink transmissions.

22. The method of claim 17, further comprising:
- performing one or more continuity measurements to determine a maximum value for a radio frequency phase difference between a plurality of repetitions of the wireless channel on a plurality of same frequency resources, between the plurality of repetitions of the wireless channel on a plurality of different frequency resources, between the plurality of repetitions of the wireless channel for each resource block in of a plurality of resource blocks, between a plurality of transmit powers corresponding to the plurality of repetitions of the wireless channel, associated with a distance between the plurality of resource blocks, associated with a power headroom, associated with a location of a plurality of frequency resources for the plurality of repetitions of the wireless channel, or a combination thereof the UE capability information indicating the maximum value for the radio frequency phase difference.

23. A method for wireless communications at an apparatus of a network device, comprising:
- obtaining user equipment (UE) capability information comprising an indication of an uplink transmission continuity capability of a UE, the uplink transmission continuity capability comprising one or more of a phase continuity or an amplitude continuity associated with slots for one or more uplink transmissions obtained over a wireless channel in accordance with the uplink transmission continuity capability of the UE, and the indication of the uplink transmission continuity capability comprising an index of a category of the uplink transmission continuity capability within a plurality of categories of uplink transmission continuity capabilities, the category corresponding to an accuracy of continuity; and
- performing channel estimation for the wireless channel in accordance with obtaining the one or more uplink transmissions.

24. The method of claim 23, wherein performing the channel estimation comprises:
- obtaining a plurality of reference signals in accordance with the one or more uplink transmissions; and
- performing a joint channel estimation procedure for the wireless channel using the plurality of reference signals and the UE capability information.

25. The method of claim 23, wherein the uplink transmission continuity capability comprises one or more parameters that indicate the accuracy of continuity, the phase continuity, or both.

26. The method of claim 23, wherein obtaining the UE capability information comprises obtaining a phase resolution value associated with the one or more uplink transmissions.

27. The method of claim 23, further comprising:
obtaining, from the UE, additional UE capability information indicating an updated uplink transmission continuity capability; and
performing additional channel estimation for the wireless channel in accordance with the additional UE capability information.

28. The apparatus of claim 1, wherein the category further corresponds to an uplink transmit power, a radio frequency phase, a relative radio frequency phase corresponding to two or more resource blocks, or any combination thereof.

29. The apparatus of claim 11, wherein the category further corresponds to an uplink transmit power, a radio frequency phase, a relative radio frequency phase corresponding to two or more resource blocks, or any combination thereof.

30. The method of claim 23, wherein the category further corresponds to an uplink transmit power, a radio frequency phase, a relative radio frequency phase corresponding to two or more resource blocks, or any combination thereof.

* * * * *